(12) United States Patent
Wu

(10) Patent No.: US 7,786,875 B2
(45) Date of Patent: Aug. 31, 2010

(54) AUDIO-ACTIVATED SOOTHING DEVICE

(76) Inventor: Chih-Hsien Wu, 15F., No. 2, Lane 21, Sec. 6, Hsin Hai, Rd., Taipei City (TW)

( * ) Notice: Subject to any disclaimer, the term of this patent is extended or adjusted under 35 U.S.C. 154(b) by 374 days.

(21) Appl. No.: 11/941,990

(22) Filed: Nov. 19, 2007

(65) Prior Publication Data
US 2009/0128343 A1 May 21, 2009

(51) Int. Cl.
*G08B 23/00* (2006.01)
(52) U.S. Cl. .................. 340/573.3; 340/573.1; 119/719
(58) Field of Classification Search ............. 340/573.1, 340/573.3, 573.5, 573.7, 407.1; 119/718, 119/719, 720, 858, 859
See application file for complete search history.

(56) References Cited

U.S. PATENT DOCUMENTS

| | | | | |
|---|---|---|---|---|
| 5,046,453 A | * | 9/1991 | Vinci | 119/718 |
| 5,749,324 A | * | 5/1998 | Moore | 119/719 |
| 5,872,516 A | * | 2/1999 | Bonge, Jr. | 340/573.3 |
| 6,003,473 A | * | 12/1999 | Printz | 119/859 |
| 7,264,377 B2 | * | 9/2007 | Cooper et al. | 362/276 |
| 2007/0200714 A1 | * | 8/2007 | Smith et al. | 340/573.1 |
| 2007/0260765 A1 | * | 11/2007 | Cooper et al. | 710/15 |

* cited by examiner

*Primary Examiner*—Van T. Trieu
(74) *Attorney, Agent, or Firm*—Leong C. Lei

(57) ABSTRACT

The soothing device is a portable waterproof device that can be worn by a baby or a dog as well as positioned on the baby's cradle or the dog house. Audio sounds can be dynamically recorded and stored in the soothing device which is powered by a built-in replaceable battery. The recorded audio sounds are automatically played by the soothing device through a built-in speaker when the soothing device detects through a built-in audio sensor a sudden large noise from some external source or by the baby's crying or by the dog's barking so as to calm the baby or the dog down quickly and automatically.

2 Claims, 5 Drawing Sheets

AUDIO-ACTIVATED SOOTHING DEVICE

TECHNICAL FIELD OF THE INVENTION

The present invention generally relates to devices for calming down a crying baby or a baking dog, and more particularly to such a soothing device that is automatically activated by the noise of the baby's crying or the dog's barking.

DESCRIPTION OF THE PRIOR ART

A common problem to pet dog owners is that, when the dogs are agitated or excited by some disturbance without their being around to control the dogs, the dog's continuous and loud barking quite often gets them into trouble with the neighbors.

Similarly, when a baby is disturbed and the baby sitter or the parent does not respond quickly to comfort the baby, the baby's continuous and sometime horrible crying is equally annoying.

However, people are all aware that the baby or the pet dog could be quickly and easily calmed down most of the times if the parent or the owner could utter or produce some audible sounds that are familiar to the baby or the dog.

SUMMARY OF THE INVENTION

Accordingly, a novel soothing device for calming down a disturbed crying baby or barking dog is provided herein.

The soothing device is designed to be a portable waterproof device so that it can be worn by a baby or a dog as well as positioned on or in the baby's cradle or the dog house. According to the present invention, audio sounds can be dynamically recorded and stored in the soothing device which is powered by a built-in replaceable battery. The recorded audio sounds are automatically played by the soothing device through a built-in speaker when the soothing device detects through a built-in audio sensor a sudden large noise from some external source or by the baby's crying or by the dog's barking so as to calm the baby or the dog down quickly and automatically.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
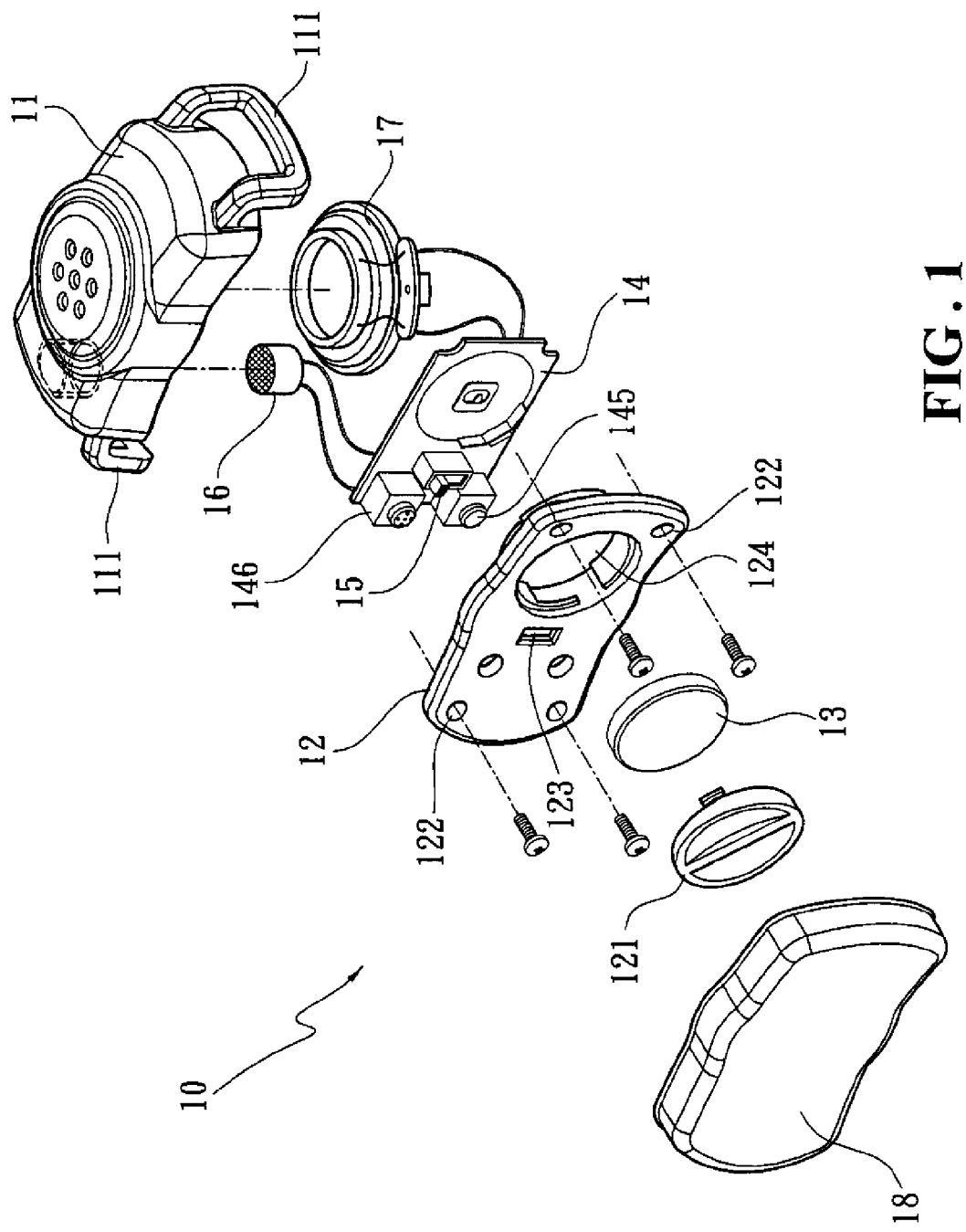
FIG. 1 is a perspective exploded view showing the various components of a soothing device according to an embodiment of the present invention.
Figure 2:
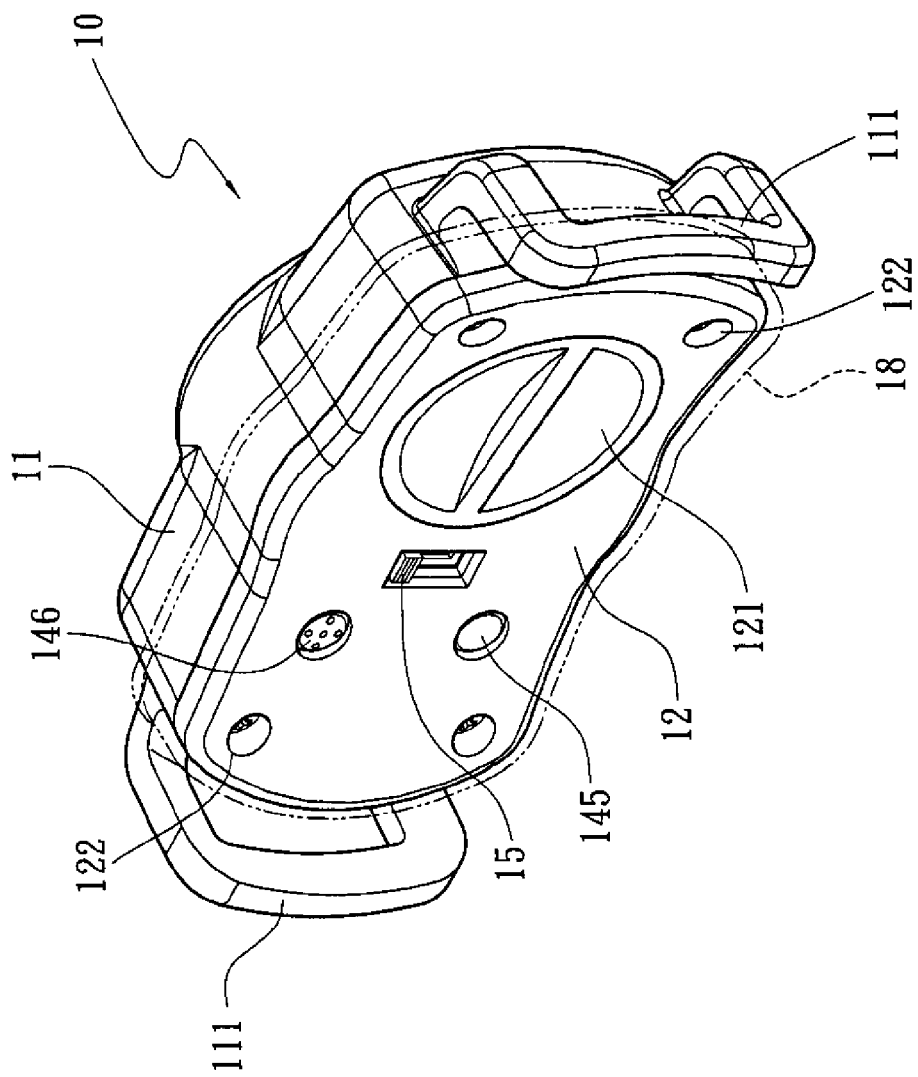
FIG. 2 is a perspective view showing the soothing device of FIG. 1 after it is assembled.

As shown in FIGS. 1 and 2, a soothing device 10 according to an embodiment of the present invention has a front cover 11 and a base 12 joined together to form a hollow casing. Inside the casing thus formed, an audio sensor 16, a speaker 17, and a control circuit on a circuit board 14 are provided and constitute the major operational mechanism of the soothing device 10.

The front cover 11 and the base 12 are securely and tightly locked together by fastening a number of screws (not numbered) through bolt holes 122 of the base 12 into the front cover 11. Two U-shaped handles 111 are fixedly attached to two opposing sides of the front cover 11 so that a strap (not shown) can be threaded through the handles 111 for reliably tying the soothing device 10 to the body of a baby or a dog.

The base 12 has a battery chamber 124 for housing a battery 13. The base 12 further has a removable cap 121 that, once removed, allows convenient access to the battery chamber 124 for replacing the battery 13. The soothing device 10 can further contains a waterproof cover 18 that can be tightly joined to a back side of the front cover 11 and thereby houses the base 12 completely inside so as to prevent water or moist to permeate into the soothing device 10 rough the bolt holes 122, the interface between the cap 121 and the battery chamber 124, the interface between the front cover 11 and the base 12, etc. Please note that, in FIG. 2, the waterproof cover 18 is shown by dashed lines.

The audio sensor 16 and the speaker 17 are fixedly attached to an inner wall of a front side of the front cover 11. A number of through openings (not numbered) are provided on the front side of the front cover 11 in front of the speaker 17 so as to allow the speaker's produced sounds to pass through. The speaker 17 is treated to be waterproof and the speaker 17 is tightly fixed to the front cover 11 so that water and moist cannot permeate into the soothing device 10 via the through openings and the speaker 17.

The audio sensor 16 and the speaker 17 are then electrically and signally connected to the control circuit on the circuit board 14 via a number of cables (not numbered). Also on the circuit board 14 and as part of the control circuit is a power switch 15 that is accessible from outside of the soothing device 10 via a trough opening 123 on the base 12. The power switch 15 is for turning on or off the operation of the soothing device 10.

The audio sensor 16 is for turning external air vibrations caused by some audio source into corresponding electrical signals. One typical example of the audio sensor 16 is a microphone. The circuit board 14 can contain an additional recording microphone 146 for recording the voices or sounds for calming down a baby or a dog. The recording function of the soothing device 10 is turned on or off by a recording button 145 on the circuit board 14. The recording microphone 146 and the recording button 145 are also parts of the control circuit on the circuit board 14, and are also exposed from the base 12 via through openings (not numbered) of the base 12.

Again, the waterproof cover 18 prevents water or moist from permeating into the soothing device 10 via these trough openings.

Figure 3:
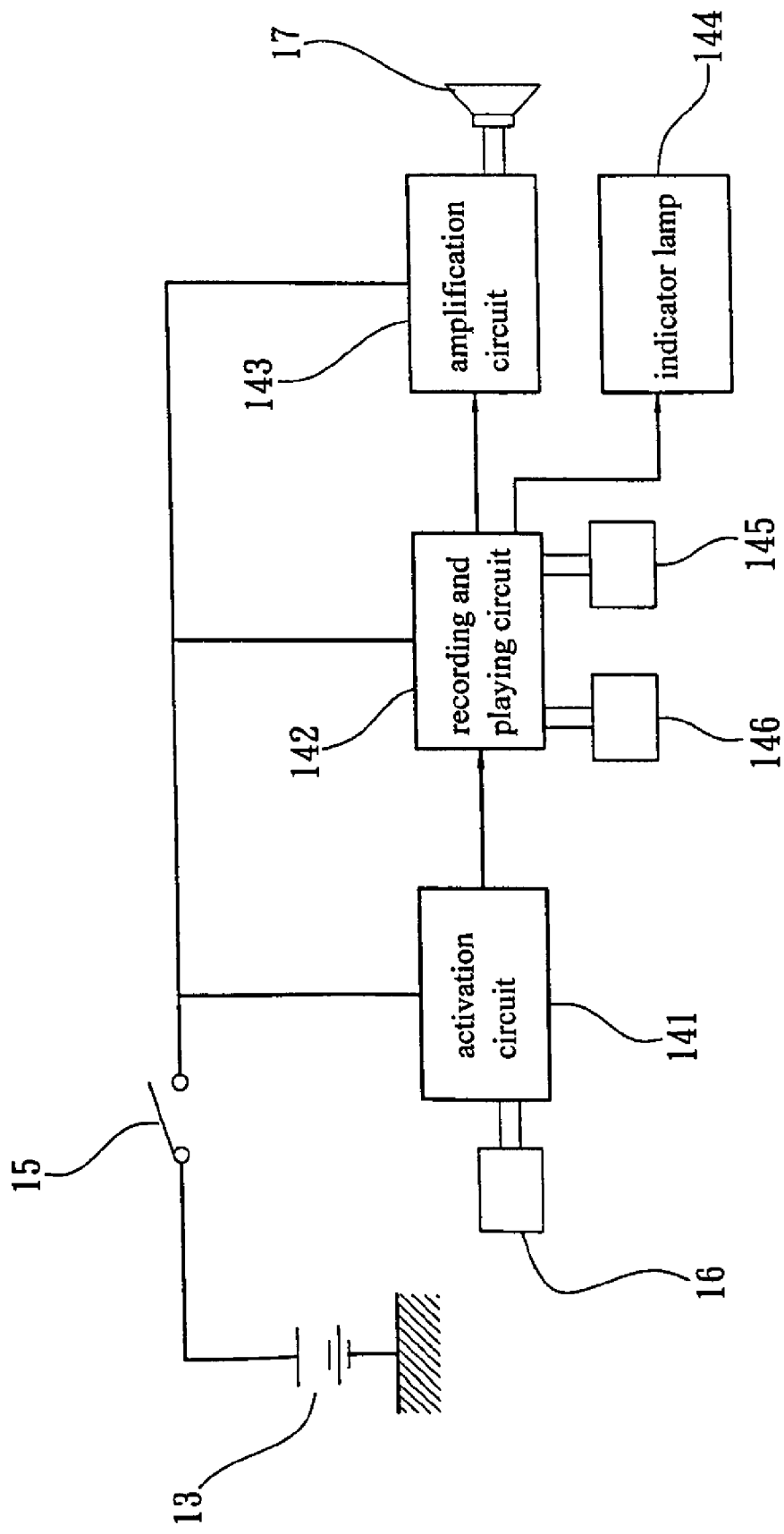
FIG. 3 is a schematic diagram showing the control circuit of the soothing device of FIG. 1.

FIG. 3 is a schematic diagram showing the control circuit of the soothing device of FIG. 1. As illustrated, the control circuit further contains an activation circuit 141, a recording and playing circuit 142, and an amplification circuit 143, whose required electricity are drawn from the battery 13 under the control of the power switch 15.

The electrical signals produced by the audio sensor 16 in accordance with external audio sounds are delivered to the activation circuit 141. When the signal level reaches a threshold, the activation circuit 141 triggers the recording and playing circuit 142 which in turn drives the amplification circuit 143 to play out the pre-recorded voices or sounds via the speaker 17.

The recording microphone 146 and the recording button 145 are also electrically and signally connected to the recording and playing circuit 142. When the recording button 145 is depressed and held down, the recording and playing circuit 142 enters a recording mode from a default playing mode and the voices or sounds captured by the recording microphone 146 are stored in a non-volatile memory (not shown) of the recording and playing circuit 142 for later playback until the recording button 145 is released.

The control circuit can further contain an indicator lamp 144 such as a light emitting diode electrically connected to the recording and playing circuit 142 to show the status of the soothing device 10.

To use the soothing device 10, the cap 121 is removed to place the battery 13 into the battery chamber 124 and the cap 121 is fastened again. The power switch 15 is then turned on and the indicator lamp 144 is lit by the control circuit to signal that the soothing device 10 is ready for operation. A user then can depress the recording button 145 to record a segment of voices, sounds, or music into the recording and playing circuit 142 until the recording button 145 is released. After the recording is done, the waterproof cover 18 is installed to the back of the top cover 11 to house the base 12 completely inside.

Figure 4:
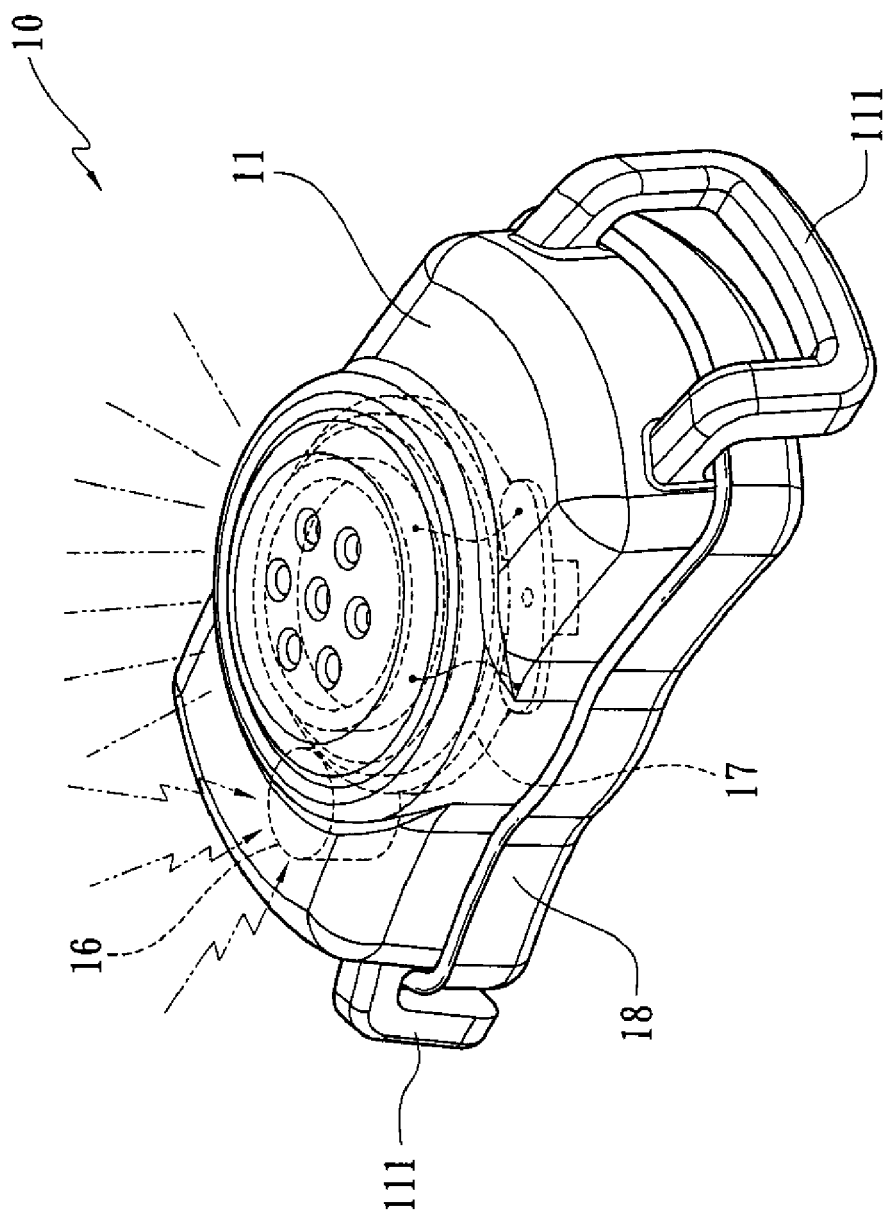
FIG. 4 is a schematic diagram showing an operation scenario of the soothing device of FIG. 1.

The soothing device 10 can be positioned inside or hanged on a dog house. As shown in FIG. 4, when a disturbing noise occurs or when the dog barks, the soothing device 10 is activated to play the recorded audio segment so as to calm the dog down. Please note that the waterproof cover 18 prevents rain water from entering and damaging the soothing device 10 if the soothing device 10 is in outdoor use. Similarly, the soothing device 10 can be placed inside a baby's cradle or hanged besides the cradle. Again, when a disturbing noise occurs or when the baby cries, the soothing device 10 is activated to play the recorded audio segment so as to calm the baby down.

Figure 5:
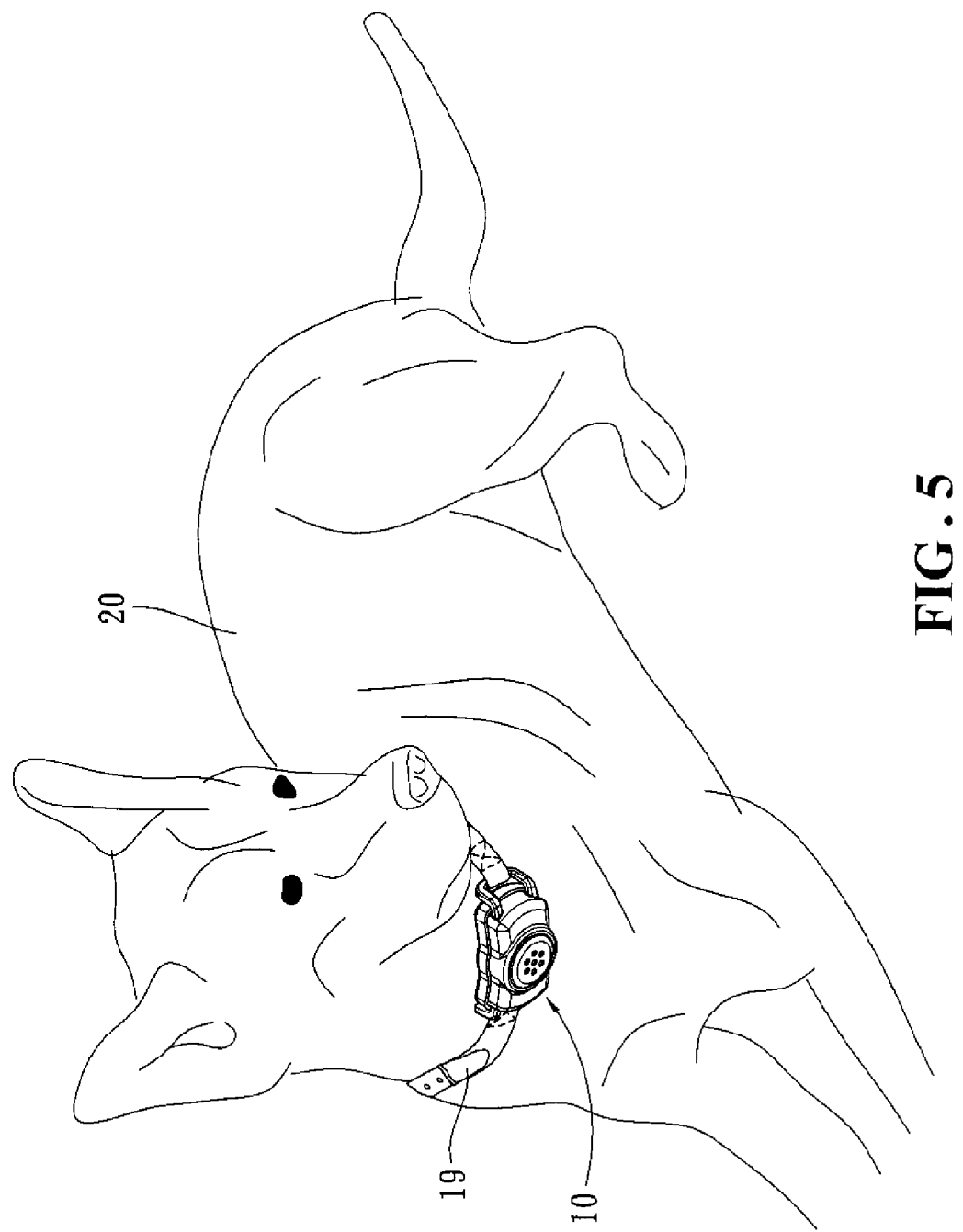
FIG. 5 is a schematic diagram showing an application of the soothing device of FIG. 1.

As shown in FIG. 5, a strap 19 can be threaded through the handles 111 to tie the soothing device 10 around the neck of a dog 20, just like a collar. As such, no matter where the dog 20 is, the soothing device 20 can function to calm the dog 20 down whenever it barks. Again, the waterproof cover 18 prevents water from entering and damaging the soothing device 10 when the dog 20 catches rain or drinks water or plays with water.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A soothing device comprising:

a front cover provided with two U-shaped handles at two opposing sides of said front cover and a plurality of through openings on a front side of said front cover for allowing sounds to pass through;

a base locked to said front cover by fastening a plurality of screws through bolt holes of said base into said front cover to form a hollow casing, said base having a battery chamber for housing a battery and a removable cap which, once removed, allows access to said battery chamber for replacing said battery;

a waterproof cover joined to a back side of said front cover thereby housing said base completely inside so as to prevent water or moist to permeate into said casing through said bolt holes, an interface between said front cover and said base;

a strap extending through said handles of said front cover for tying said casing to a body of a dog;

a circuit board mounted inside said casing and having a control circuit having a recording microphone for recording voices or sounds for calming down a baby or a dog, said control circuit further having a recording button for turning on or off recording function, said recording microphone and said recording button being parts of said control circuit on said circuit board and being exposed from said base via through opening of said base, said control circuit containing an activation circuit, a recording and playing circuit and an amplification circuit whose required electricity are drawn from said battery;

an audio sensor fixedly attached to an inner wall of said front cover and electrically and signally connected to said control circuit, said audio sensor being for turning external air vibrations caused by audio source into corresponding electrical signals;

a speaker electrically and signally connected to said control circuit;

a power switch provided on said circuit board and accessible from outside of said casing via a through opening on said base, said power switch being for turning on or off operation of said soothing device; and an indicator lamp electrically connected to said control circuit to indicate a current status of said soothing device by said control circuit;

wherein when said power switch is turned on, a user then can depress said recording button to record an audio segment into said recording and playing circuit until said recording button is released, and when a disturbing noise occurs or when said dog barks, said recording and playing circuit will be activated to play said audio segment so as to calm down said dog thereby calming down said dog whenever said dog barks.

2. The soothing device as claimed in claim 1, wherein said audio sensor is a microphone.

* * * * *